(12) United States Patent
Garcia

(10) Patent No.: US 6,449,959 B1
(45) Date of Patent: Sep. 17, 2002

(54) PACKAGING SYSTEM FOR FRAGILE MERCHANDISE

(76) Inventor: Ana Tabuenca Garcia, Camelias, 14, 28042 Madrid (ES)

( * ) Notice: Subject to any disclaimer, the term of this patent is extended or adjusted under 35 U.S.C. 154(b) by 0 days.

(21) Appl. No.: 09/580,677

(22) Filed: May 30, 2000

(30) Foreign Application Priority Data

May 28, 1999 (ES) .............................................. 9901153

(51) Int. Cl.[7] .............................................. F25B 21/02
(52) U.S. Cl. .............................. 62/3.7; 63/3.3; 63/3.4; 63/371; 63/176.1
(58) Field of Search ............................ 62/3.4, 3.3, 3.7, 62/371, 176.1

(56) References Cited

U.S. PATENT DOCUMENTS

| | | | | |
|---|---|---|---|---|
| 4,253,515 A | * | 3/1981 | Swiatosz ...................... 165/61 |
| 4,425,998 A | * | 1/1984 | Hof et al. .................... 206/306 |
| 4,922,721 A | * | 5/1990 | Robertson et al. ........... 62/3.61 |
| 5,320,162 A | * | 6/1994 | Seaman ......................... 165/2 |
| 5,603,220 A | * | 2/1997 | Seaman ......................... 62/3.7 |
| 5,924,302 A | * | 7/1999 | Derifield .................... 62/457.2 |
| 6,038,865 A | * | 3/2000 | Watanabe et al. .............. 62/3.6 |
| 6,098,408 A | * | 8/2000 | Levinson et al. .............. 62/3.2 |
| 6,116,042 A | * | 9/2000 | Purdum ........................ 62/371 |
| 6,119,465 A | * | 9/2000 | Mullens et al. ................ 62/60 |
| 6,189,330 B1 | * | 2/2001 | Retallick et al. .............. 62/371 |

* cited by examiner

*Primary Examiner*—William C. Doerrler
*Assistant Examiner*—Mark Shulman
(74) *Attorney, Agent, or Firm*—Reed Smith LLP

(57) ABSTRACT

On the basis of any conventional suitable container (1), this system incorporates a set of elements which act in a distributed manner (2), which using the information supplied by a series of temperature sensors (4) and activated by a data acquisition and control system (3) make it possible to pump heat out of the container or into the same, these elements preferentially taking the form of Peltier cells, and a series of distributed sensors (6), consisting of a humidity sensor (7), a vibration sensor (8), a pressure sensor (9) and a control (10) of the opening and closing of the container (1), which makes it possible control maneuvres of this type which are carried out during transport, and a series of interfaces that make it possible for the data acquisition and control system (3) to communicate with the exterior, more specifically a PC interface (12) for connection to a computer (16), and an operator card interface (14) which makes it possible to extract information on the conditions of the merchandise in real time.

15 Claims, 1 Drawing Sheet

PACKAGING SYSTEM FOR FRAGILE MERCHANDISE

DESCRIPTION

The Subject of the Invention

This invention is applicable within the field of the transport of fragile merchandise, in which certain parameters have to be controlled in order to attain a correct conservation and manipulation of merchandise during transport, in terms of mechanical fragility as well as of ambient conditions such as temperature, pressure, relative humidity, etc.

Within the broad range of possible practical applications for the system covered by the invention it is possible to mention, as an example, the transport of works of art, which due to their cultural and economic importance has to take place under the strictest conditions.

As well as maintaining strict control over all of the above-mentioned parameters, the system covered by the invention also makes it possible to maintain the temperature within containers constant and homogeneous.

ANTECEDENTS OF THE INVENTION

Classical container systems are basically designed to protect the merchandise in question against the mechanical effects of impact or poor handling, but although these systems are valid for a broad range of merchandise, they are completely insufficient for certain types of delicate goods.

More advanced systems make it possible to protect merchandise not only against the effects arising directly due to the said knocks or impacts, but also against vibration generated by any cause.

In this respect it is possible to cite, for example, Spanish invention patent application No. P901433, corresponding to the same applicant and in which the object to be transported, more specifically a work of art, is placed "in suspension" in the centre of the packaging box which constitutes the container itself, and is connected to the same by elastic means which, suitably distributed, keep the object in the position selected for transport and absorb the vibration caused by impact against the box or any other reason.

Nevertheless, certain items of delicate merchandise, such as the afore-mentioned works of art, require certain ambient conditions during transport, in terms of temperature, pressure and humidity, etc., for example, such parameters not having been controlled to date, being liable to major fluctuations, especially in the case of transport by air.

On the other hand, it would also be desirable to be able to precisely monitor the conditions which have prevailed during transport, as well as if the container has been opened during the same.

To date no solution to the problems expounded above has been available, excepting the use of climate controlled display cabinets, as well as systems to insulate and seal the casings used for containers, and which are clearly insufficient.

DESCRIPTION OF THE INVENTION

The container system for delicate merchandising proposed by this invention resolves the problems described above in a way that is fully satisfactory, and it stores the data corresponding to the above-mentioned criteria while governing the temperature throughout transport, making it possible to control and guarantee the conditions under which this has taken place.

To this end, and more specifically, within the container itself, which may be equipped with means of attachment such as those covered by the above-mentioned patent or any others that are considered suitable, and which will preferentially be fitted with an airtight seal, there will be multiple sensors suitable for detecting temperature, relative humidity, pressure, level of vibration and any other parameter that it is deemed prudent to measure, forming as a whole a set of distributed ambient condition sensors which will constantly send information to a data acquisition and control system which also acts on bi-directional heat pumps, making it possible to control the temperature within the container and keep it uniform.

The said heat pumps are distributed in matrix formation throughout the inside of the container, in the cover as well as in the box of the same, and given that they must be bi-directional, as was pointed out above, i.e., able to pump heat outward as well as inward, depending on the heat level set as optimum for transport, the decision was made to use Peltier cells as the active mechanisms.

It is therefore planned to install one temperature sensor for each of the active elements installed, the number and arrangement of which will vary depending on the size of the container to be controlled.

It is also planned to install a sensor to detect the opening and closing of the container within the set of control elements, with the aim of monitoring and recording operations of this type that occur during transport.

The data control and acquisition system has the task of acquiring the data supplied by the elements of the distributed sensor system, and acting on the elements actively involved in controlling the temperature within the container, keeping it within the limits programmed by the user.

Communication between the data acquisition and control system and the outside of the container is to take place by means of several interfaces, specifically a PC interface that makes it possible to dump the data corresponding to the parameters being monitored during transport into a personal computer for inspection and/or storage, a card interface enabling the record corresponding to the merchandise transported to be stored on an intelligent card that also contains the ambient parameters needed for the correct transportation of the merchandise in question, and finally an operator interface through which it is possible to extract information on the conditions of the merchandise in real time at any moment.

DESCRIPTION OF THE DRAWING

Complementary to the description being given, and with the aim of aiding comprehension of the characteristics of the invention, according to a practical execution of the same, this description is accompanied by a single sheet of plans which forms an integral part of the same, which as an illustration and non-restrictively shows in its single FIGURE a diagram corresponding to the container system for delicate merchandise that corresponds to the subject of this invention.

PREFERRED EMBODIMENT

Figure 1:
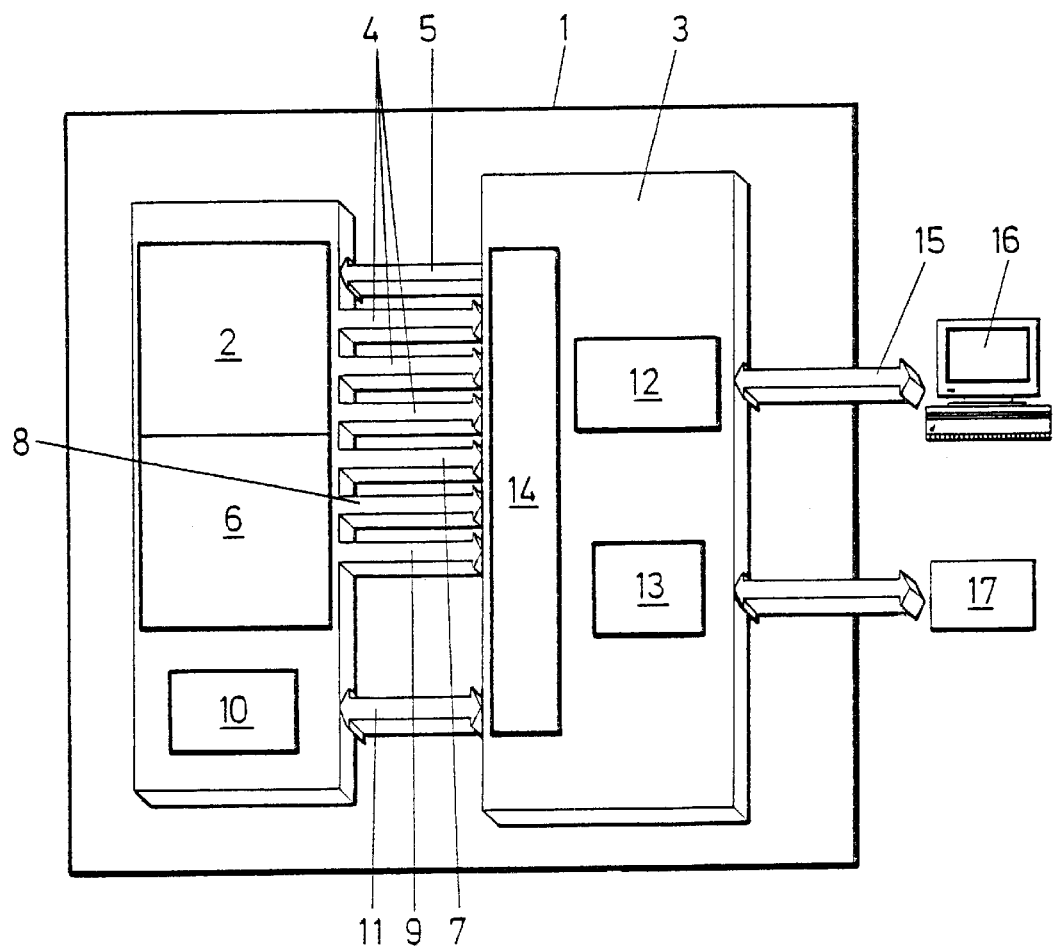

In the light of this FIGURE, in which the container has been shown by means of a simple rectangle marked with reference (1), and which obviously will be equipped with a body and cover, preferentially air tight, it may be seen that the invention includes a series of distributed active elements (2) consisting of heat pumps, more specifically Peltier cells, which are intrinsically bidirectional, as they are based on an effect contrary to that of a thermocouple, i.e., when a certain voltage is applied to a Peltier cell a known temperature difference is produced between both sides of the cell, which thereby gives rise to a flow of heat from one side to the other, while if the polarity of the voltage applied is reversed then the heat flow is also reversed.

As a result of the above considerations, these Peltier cells used as distributed working elements, and depending on the polarity applied to them, absorb heat from within the container (1) and transmit it to the exterior, or vice versa, being completely governed by certain pre-set heat levels and according to the orders received from a data acquisition and control system (3), which receives information from heat sensors (4) that monitor the temperature of the cells themselves, as well as the temperatures inside and outside the container, comparing them with the values that have been pre-set as ideal for the inside of the container (1), and generating signals (5) to control the working of each and every one of the Peltier cells.

The system also consists of a distributed set of ambient condition sensing elements (6) that supply information on humidity (7), the level of vibration (8) and pressure (9) inside the container, in such a way that the data acquisition and control system (3) stores the data corresponding to these parameters.

The system also includes an opening and closing control (10) that by means of communication (11) also sends information to the data acquisition and control system (3), so that data may be stored on the number of times that the container (1) has been opened during transport.

As well as acting on the Peltier cells, i.e., generating the distributed working (2) of each and every one of the same in order to maintain the temperature within the container within the limits established to this end, the data acquisition and control system (3) also includes, as means of communicating with the exterior, several interfaces (12), (13) and (14), of which more specifically interface (12) is used to establish communication (15) with a personal computer (16) or similar device, enabling data to be inspected and/or stored after each stage of transport, while interface (13) is a card interface, making it possible to transfer all of the information corresponding to transport to an intelligent card (17), which also and as was pointed out above stores the ambient parameters that are necessary for the correct transportation of each specific item of merchandise, while finally interface (14) is an operator interface, enabling the latter at any time to extract information on the conditions of the merchandise at any moment during transport.

Logically the container must have a suitable source of electric power, being either connected to the power transmission system or equipped with batteries that are able to power it for the necessary time.

Although this description has been drawn up on the basis of one of the preferential applications of the packaging system, the transport of works of art, it is evident that the said system may be used for transporting any other types of merchandise which requires similar features in terms of control.

What is claimed is:

1. A packaging system for fragile merchandise, such as works of art or any other type of merchandise which has to be transported under the strictest conditions, and which on the basis of a container or packaging (1) of any conventional and appropriate type, is characterized by the fact that it includes a series of elements for distributed working (2) that make it possible to control and maintain a uniform temperature within the container, using the information supplied by a series of temperature sensors (4), said elements being activated by a data acquisition and control system (3) which stores information relating to the pre-set limits for said temperature during transport, and which also includes a series of distributed sensing elements (6), which in turn take the form of humidity sensors (7), vibration sensors (8) and pressure sensors (9), which also send information to the data acquisition and control system (3), which incorporates a system to monitor the opening and closing (10) of the container, which will likewise supply information to the system (3) for the acquisition and control of data, the latter being able to dump said data externally at appropriate moments.

2. A packaging system for fragile merchandise, according to claim 1, characterized by the fact that the distributed working elements (2), which are distributed in a matrix formation within the cover as well as the box of the container (1), are Peltier cells that, depending on the heat level within the container (1), and the polarity of the power supplied to the same through the data acquisition and control system (3), are able to either pump heat into the container (1) or pump it out of the same.

3. A packaging system for fragile merchandise, according to claim 1, characterized by the fact that the data acquisition and control system is equipped with three interfaces, one for a PC (12), through which the system is able to dump data to a computer (16) for inspection and/or storage, a card interface (13), which makes it possible to record transport of merchandise by using an intelligent card (17), and which also contains the ambient parameters that are required for the correct transportation of merchandise, and an operator interface (14) which makes it possible to extract information on the conditions of merchandise in real time.

4. An apparatus for safely transporting an article comprising:
    a closable container to carry said article inside said container;
    said container having an environmental sensor capable of making a measurement of ambient conditions inside said container; and
    an environment controller responsive to said environmental sensor to maintain predetermined ambient conditions inside said container while carrying said article; said predetermined ambient conditions established to protect said article while in said container and further comprising a container monitor connected to said container capable of counting each instance that said container is opened and closed.

5. An apparatus for safely transporting an article comprising:
    a closable container to carry said article inside said container;
    said container having an environmental sensor capable of making a measurement of ambient conditions inside said container which conditions include vibration inside said container; and
    an environment controller responsive to said environmental sensor to maintain predetermined ambient conditions inside said container while carrying said article; said predetermined ambient conditions established to protect said article while in said container.

6. An apparatus as claimed in claim 5 or 4 wherein said predetermined ambient conditions include temperature inside said container.

7. An apparatus as claimed in claim 5 or 4 wherein said predetermined ambient conditions include pressure inside said container.

8. An apparatus as claimed in claim 5 or 4 wherein said predetermined ambient conditions include humidity inside said container.

9. An apparatus as claimed in claim 6, wherein said environmental controller includes a heat pump system to transfer heat in and out of said container.

10. An apparatus as claimed in claim 9, wherein said heat pump system includes Peltier cells.

11. An apparatus as claimed in claim 5 or 4 further comprising a processing unit to receive and record said measurements of said ambient conditions from said environmental sensor.

12. An apparatus as claimed in claim 11, further comprising a display to allow a user to read said measurements.

13. An apparatus as claimed in claim 11, wherein said processing unit stores said predetermined ambient conditions.

14. An apparatus as claimed in claim 9, wherein said heat pump system includes a plurality of heat pumps.

15. An apparatus as claimed in claim 14, wherein said plurality of heat pumps are arranged in a matrix formation.

\* \* \* \* \*